(12) United States Patent
P J

(10) Patent No.: US 12,483,526 B2
(45) Date of Patent: Nov. 25, 2025

(54) COMMUNICATIONS MANAGEMENT FOR A COMMUNICATION PLATFORM

(71) Applicant: Salesforce, Inc., San Francisco, CA (US)

(72) Inventor: Jose Lejin P J, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/505,832

(22) Filed: Nov. 9, 2023

(65) Prior Publication Data

US 2025/0158951 A1   May 15, 2025

(51) Int. Cl.
*H04L 51/216*   (2022.01)
*G06F 3/04842*   (2022.01)
*G06F 40/279*   (2020.01)

(52) U.S. Cl.
CPC ........ *H04L 51/216* (2022.05); *G06F 3/04842* (2013.01); *G06F 40/279* (2020.01)

(58) Field of Classification Search
CPC .... G06Q 10/10; G06Q 10/109; H04L 51/216; H04L 67/535; H04L 51/043
See application file for complete search history.

(56) References Cited

U.S. PATENT DOCUMENTS

| | | | | |
|---|---|---|---|---|
| 8,522,163 B2* | 8/2013 | Relyea | ................. | G04G 9/0082 715/834 |
| 8,843,824 B1* | 9/2014 | Daly, IV | ............. | G06F 3/04842 715/712 |
| 8,902,715 B2* | 12/2014 | Tu | ....................... | G06F 3/04847 368/242 |
| 8,930,841 B2* | 1/2015 | Huang | ................ | G06F 3/04842 715/764 |
| 8,977,953 B1* | 3/2015 | Pierre | .................. | G06F 40/289 715/201 |
| 9,274,505 B2* | 3/2016 | Johns | ................ | H04M 1/72451 |
| 9,489,657 B2* | 11/2016 | Chudge | ................ | H04L 51/043 |
| 10,305,850 B1* | 5/2019 | Aziz | ....................... | G06Q 50/01 |
| 10,389,662 B2* | 8/2019 | Chudge | ................ | H04L 67/535 |
| 10,459,819 B2* | 10/2019 | Chen | ..................... | G06F 11/323 |
| 2006/0101022 A1* | 5/2006 | Yu | .......................... | G06Q 10/10 |
| 2007/0060205 A1* | 3/2007 | Kim | ....................... | G06Q 10/02 455/566 |
| 2008/0081594 A1* | 4/2008 | Lee | .................. | H04M 1/72427 715/764 |

(Continued)

*Primary Examiner* — David R Lazaro
(74) *Attorney, Agent, or Firm* — Sterne, Kessler, Goldstein & Fox P.L.L.C.

(57) ABSTRACT

A user device (e.g., a computing device, a smart device, a mobile device, a laptop, a tablet, a set-top box, a display device, etc.) may generate, based on a request for conversational history information, a timeline for a user interface comprising an interactive timeline indicator indicating a conversation that occurred during a time window. The user device may display, based on an interaction with the interactive timeline indicator, a graphical representation of the time window that indicates a circular order of occurrence for the conversation and other conversations that occurred during the time window. The user device may display the conversation based on an interaction with an interactive element that indicates when within the circular order of occurrence the conversation occurred.

20 Claims, 4 Drawing Sheets

(56) References Cited

U.S. PATENT DOCUMENTS

| | | | |
|---|---|---|---|
| 2010/0157742 A1* | 6/2010 | Relyea | G04G 11/00 |
| | | | 715/833 |
| 2013/0218987 A1* | 8/2013 | Chudge | H04L 51/043 |
| | | | 709/206 |
| 2017/0126594 A1* | 5/2017 | Chudge | H04L 51/216 |
| 2017/0235739 A1* | 8/2017 | Yang | G06F 3/0481 |
| | | | 715/781 |
| 2018/0158068 A1* | 6/2018 | Ker | H04L 67/535 |
| 2018/0359293 A1* | 12/2018 | Faulkner | H04L 65/403 |
| 2021/0168110 A1* | 6/2021 | Marmar | G06F 40/30 |
| 2025/0158951 A1* | 5/2025 | P J | G06F 3/04842 |

* cited by examiner

COMMUNICATIONS MANAGEMENT FOR A COMMUNICATION PLATFORM

BACKGROUND

Communication platforms, such as chat applications and the like, are becoming more prevalent in people's daily lives with the increasing popularity of smartphones and other smart devices. Many people use multiple communication platforms daily. For example, a computer programmer may use multiple chat applications and messaging tools for work, and a college student may use various communication platforms to communicate with friends and classmates. When a user needs to refer to a previous communication, such as a chat or chat thread, the user may not even remember with which chat application the communication occurred. Even if a user remembers within which chat application a chat or chat thread occurred, the user is often unable to identify the chat or chat thread amongst multiple different chats or chat threads, much less review the chat or chat thread to extract meaningful data. Users are unable to effectively search multiple chat applications or communication platforms to identify and review prior chats or chat threads.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Provided herein are system, apparatus, device, method, computer program product embodiments, and/or combinations and sub-combinations thereof, for displaying a summary of chat application conversations specific to a user. A user device (e.g., a computing device, a smart device, a mobile device, a laptop, a tablet, a set-top box, a display device, etc.) may initiate and/or participate in various chats across multipage communication platforms (e.g., via websites, applications, etc.). A user may desire to search for or find a prior conversation across multiple communication platforms. According to some aspects of this disclosure, the user device may enable a user to search for or find a prior conversation across multiple chat applications and display a summary of chat application conversations specific to the user. The user device may generate a graphical representation of a time window that indicates a circular order of occurrence for the conversation and other conversations that occurred during the time window.

This way, the user may find a prior conversation across multiple chat applications or communication platforms and avoid getting lost in standard search or find options, while also significantly increasing the rate at which the user can view, access, and/or navigate to prior conversations of the multipage communication platforms.

Figure 1:
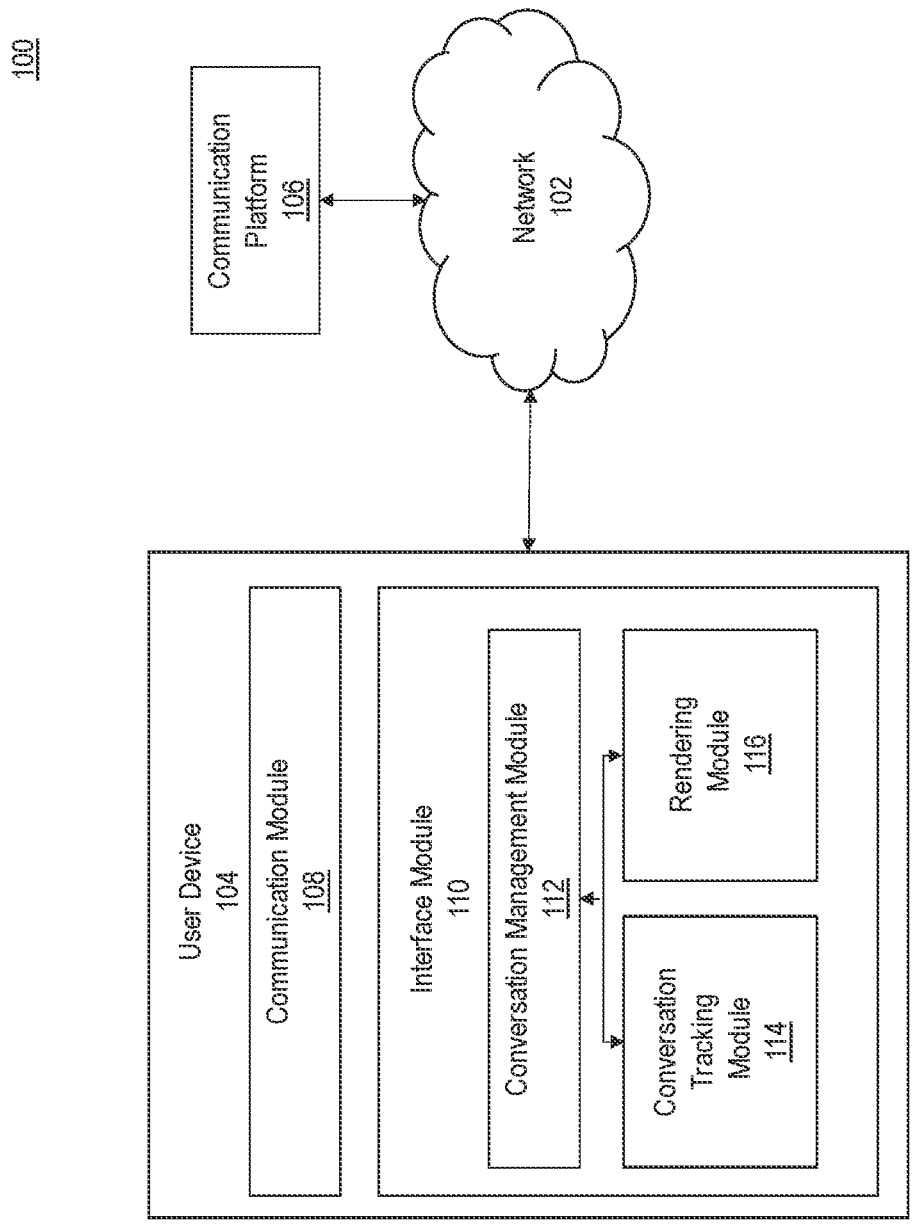
FIG. 1 shows an example system for displaying a summary of chat application conversations specific to a user, according to some aspects of this disclosure.

FIG. 1 shows an example system 100 for displaying a summary of chat application conversations. According to some aspects of this disclosure, the conversations may be specific to a user. System 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

System 100 may include a network 102. Network 102 may include a packet-switched network (e.g., internet protocol-based network), a non-packet-switched network (e.g., quadrature amplitude modulation-based network), and/or the like. Network 102 may include network adapters, switches, routers, modems, and the like connected through wireless links (e.g., radiofrequency, satellite) and/or physical links (e.g., fiber optic cable, coaxial cable, Ethernet cable, or a combination thereof). Network 102 may include public networks, private networks, wide area networks (e.g., Internet), local area networks, and/or the like. Network 102 may include a content access network, content distribution network, and/or the like. The Network 102 may provide and/or support communication from telephone, cellular, modem, and/or other electronic devices to and throughout the system 100. For example, system 100 may include a user device 104 in communication with a communication platform 106 via the network 102.

According to some aspects of this disclosure, the user device 104 may include a computing device, a smart device, a mobile device, a laptop, a tablet, a set-top box, a display device, or any other device capable of communicating with the communication platform 106. The user device 104 may include a communication module 108 that facilitates and/or enables communication with the communication platform 106 and/or any other device/component of the system 100. For example, communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects of this disclosure, the user device 104 may include an interface module 110. The interface module 110 enables a user to interact with the user device 104, the communication platform 106, and/or the like. The interface module 110 may include any interface for presenting and/or receiving information to/from a user.

According to some aspects of this disclosure, the interface module 110 may include a user interface (UI) that enables communications between users via a communication integration application. The communication integration application may support and/or implement the communication platform 106. According to some aspects of this disclosure, the communication platform 106 may include the communication integration application (and/or any other application, API, instances, etc.) and/or one or more devices (e.g., middleware servers, application servers, computing devices, etc.) in communication with, supporting, and/or associated with the user device 104.

According to some aspects of this disclosure, the communication platform 106 may support many Internet Relay Chat (IRC)-style features, including persistent chat rooms (channels) organized by topic, private groups, and direct messaging. The communication platform 106 may enable and/or support communications and/or discussions among any number of users and/or participants, for example, via conversation channels, as well as communications and/or discussions between only two users and/or participants (e.g., via question-and-answer dialogues, etc.). Any user and/or participant may open a new conversation channel. The communication platform 106 may enable a single device, for example, a user device 104 of a customer organization and/or the like, to take part in several simultaneous conversation channels. According to some aspects of this disclosure, the interface module 110 may include a conversation management module 112. The conversation management module 112 enables a user to view prior conversations across multiple chat applications, conversation applications, conversation platforms, and/or communication platforms. For example, the conversation management module 112 may be used to access and/or view conversations and/or the like of an application configured with, and/or accessible by the user device 104. The conversation management module 112 may be used to access and/or view conversations and/or the like of a user interface (e.g., the interface module, a web browser, etc.) generated by, configured with, and/or accessible by the user device 104. According to some aspects of this disclosure, the conversation management module 112 may include a chat application or conversation application (e.g., Slack®, Microsoft Teams®, Google Hangouts®, WebEx®, or the like). The conversation management module 112 may request or query various files from a local source and/or a remote source, such as the communication platform 106, and/or the like. The conversation management module 112 may access, process, and view conversations available to it from system 100 via network 102.

According to some aspects of this disclosure, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. Interaction with the input devices and/or components may enable a user to view, visit, access, request, and/or navigate to a conversation generated and/or displayed by the interface module 110 and/or accessible via the conversation management module 112.

According to some aspects of this disclosure, the interface module 110 may include a conversation tracking module 114. The conversation tracking module 114 may track each conversation of a chat application, conversation application, chat platform, or conversation platform that is accessed, initiated, requested, and/or participated in by the user device. According to some aspects of this disclosure, the conversation tracking module 114 may communicate with a rendering module 116 of the interface module 110. The conversation tracking module 114 may communicate data/information indicative of each conversation of a conversation application that is accessed, initiated, requested, and/or participated in by the user device. The rendering module 116 may use the data/information indicative of each conversation of a chat application that is accessed, initiated, requested, and/or participated in by the user device 104 to generate, render, and/or cause to be displayed a summary of chat application conversations specific to a user. The summary of chat application conversations may include and/or indicate, for example, each conversation of a chat application that is accessed, initiated, requested, and/or participated in by the user device 104 or by a user of the user device 104.

According to some aspects of this disclosure, the conversation tracking module 114 may include one or more trained predictive models. For example, predictive models may be trained to recommend conversations on communications platform 106 and/or the like that may be related to other conversations to help the user.

To train the predictive model(s) historical conversation and/or communication data including, but not limited to, text, participants, timestamps, and related metadata from communication platform 106 may be collected. The collected historical conversation and/or communication data may be preprocessed and/or cleaned to remove stop words and special characters and/or reduce words to their root or base form. Features may be extracted from the text of the collected historical conversation and/or communication data text using techniques including, but not limited to, Term Frequency-Inverse Document Frequency (TF-IDF), Word2Vec, and/or the like. The features may be labeled (e.g., manually, algorithmically, etc.) to identify related conversations within the collected historical conversation and/or communication data. For example, labeled data sets generated from the collected historical conversation and/or communication data may be used to train the predictive model(s) utilizing techniques including, but not limited to, a siamese neural network (SNN), discriminant analysis, decision tree analysis, a nearest neighbor (NN) algorithm (e.g., k-NN models, replicator NN models, etc.), a statistical algorithm (e.g., Bayesian networks, etc.), a clustering algorithm (e.g., k-means, mean-shift, etc.), other neural networks (e.g., reservoir networks, artificial neural networks, etc.), support vector machines (SVMs), logistic regression algorithms, linear regression algorithms, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, a combination thereof and/or the like.

According to some aspects of this disclosure, the predictive model(s) may be tested for metrics including, but not limited to, accuracy, precision, and recall on a validation dataset. The validation dataset may be real-time and/or collected conversation and/or communication data from communication platform 106. The trained model may then be used to recommend conversations on communications platform 106 and/or the like that may be related to other conversations. Outputs from the predictive model(s) may be continuously collected and evaluated to refine and/or improve the performance of the predictive model(s).

Figure 2:
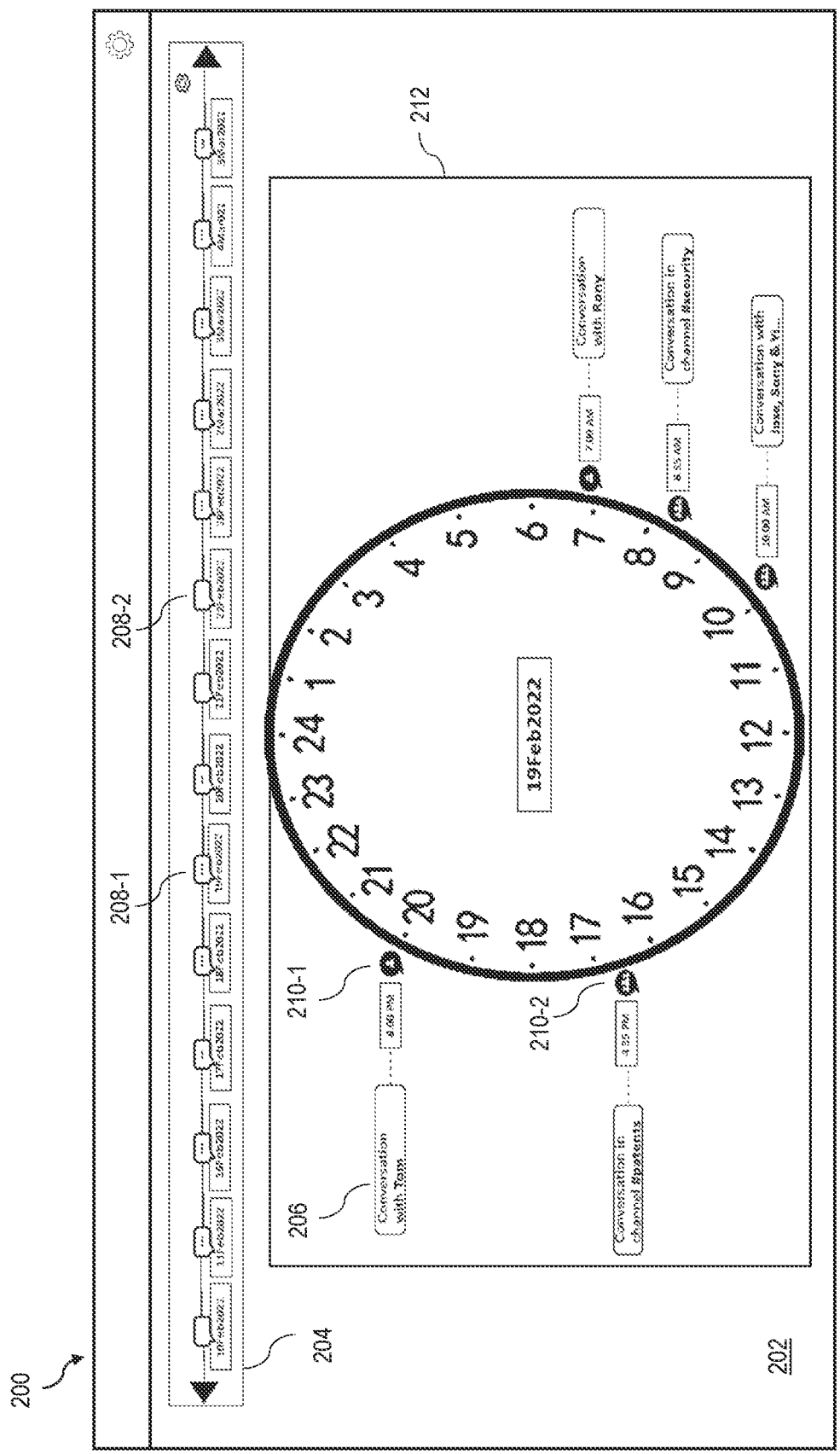
FIG. 2 shows an example page of a user interface, according to some aspects of this disclosure.

FIG. 2 shows an example of a page or view 202 of a user interface 200 generated, accessed, and/or displayed by the interface module 110. Page 202 may include a navigational area 204 allocated for the display of different time windows generated, rendered, and/or caused to be displayed by the rendering module 116. According to some aspects of this disclosure, the navigational area 204 may comprise a timeline that includes an interactive timeline indicator or conversation icon 208. The timeline may be rendered in a web view, full window, and/or the like of a chat application. A range of the timeline may be configurable. For example, a range of the timeline may be selected or configured by a user. The page or view 202 may include a settings button. The settings button may allow the user to configure custom time period, all time period, and/or configure another setting. When the settings button is clicked, a pop-up window or view may be displayed for the user to select among options such as "Custom Time Period" and "View All." The interactive timeline indicator 208 may indicate a conversation that occurred during a time window based on a request for conversational history information. According to some aspects of this disclosure, a time window may be a day or part of a day and the date of the day may be displayed on the timeline. A time window or a date might not be displayed when no conversation occurred during that time window or on that date in any of the chat applications for the user. Alternatively, an interactive timeline indicator with three dots 208-1 may be displayed to indicate at least one conversation occurred during that time window or on that date. In the case of no conversation for a time window or date, an interactive timeline indicator with no dots 208-2 may be displayed.

The page or view 202 may display a graphical representation or conversation summary UI view 212 of the time window based on an interaction with the interactive timeline indicator 208. According to some aspects of this disclosure, the interactive timeline indicator 208 associated with a date may be highlighted or the color of the interactive timeline indicator 208 associated with the date may change when the date is selected. According to some aspects of this disclosure, the graphical representation 212 of the time window may indicate a circular order of occurrence for the conversation and other conversations that occurred during the time window.

For example, when the interactive timeline indicator 208-1 for Feb. 19, 2022, is interacted with, clicked, selected, and/or the like, the interactive timeline indicator 208-1 may be highlighted or the color of the interactive timeline indicator 208-1 may change, and/or a graphical representation 212 may be displayed. The graphical representation 212 may indicate the circular order of occurrence for the conversations that occurred on Feb. 19, 2022, e.g., with the exact times in the order that the conversations occurred.

According to some aspects of this disclosure, an interactive element 210 may indicate a feature of the conversation. For example, the interactive element 210 may indicate a type of user(s) associated with the conversation, an amount of user(s) associated with the conversation, and/or the like, via different interactive elements, by varying the color of interactive elements, and/or the like. For example, the interactive element 210 may indicate whether the conversation was internal or external, e.g., with user(s) from inside an organization or with user(s) from outside the organization such as clients. An interactive element 210-1 may indicate the conversation was with a single user while an interactive element 210-2 may indicate the conversation was with a group of users. Based on an interaction with the interactive element 210, keywords related to or within the conversation may be displayed. For example, keywords related to the conversation (e.g., indicated by a conversation indicator 206), such as "Conversation with Tom" or "Conversation in channel #patents," may be displayed when a cursor is hovered over the interactive element 210. Alternatively, a setting may be used to toggle between displaying and hiding the keywords for the conversations during the time window. When a conversation participator's name is lengthy, only a part of the name may be displayed, e.g., with three dots displayed inside the conversation indicator 206, next to an interactive element icon 210 associated with the conversation.

The user device 104 may display the conversation based on another interaction with the interactive element 210. According to some aspects of this disclosure, the conversation may be displayed in a corresponding chat application with which the conversation occurred. For example, the interactive element 210 may include a hyperlink, upon clicking on which the conversation may be displayed in the corresponding chat application or communication platform 106 with which the conversation occurred.

Figure 3:
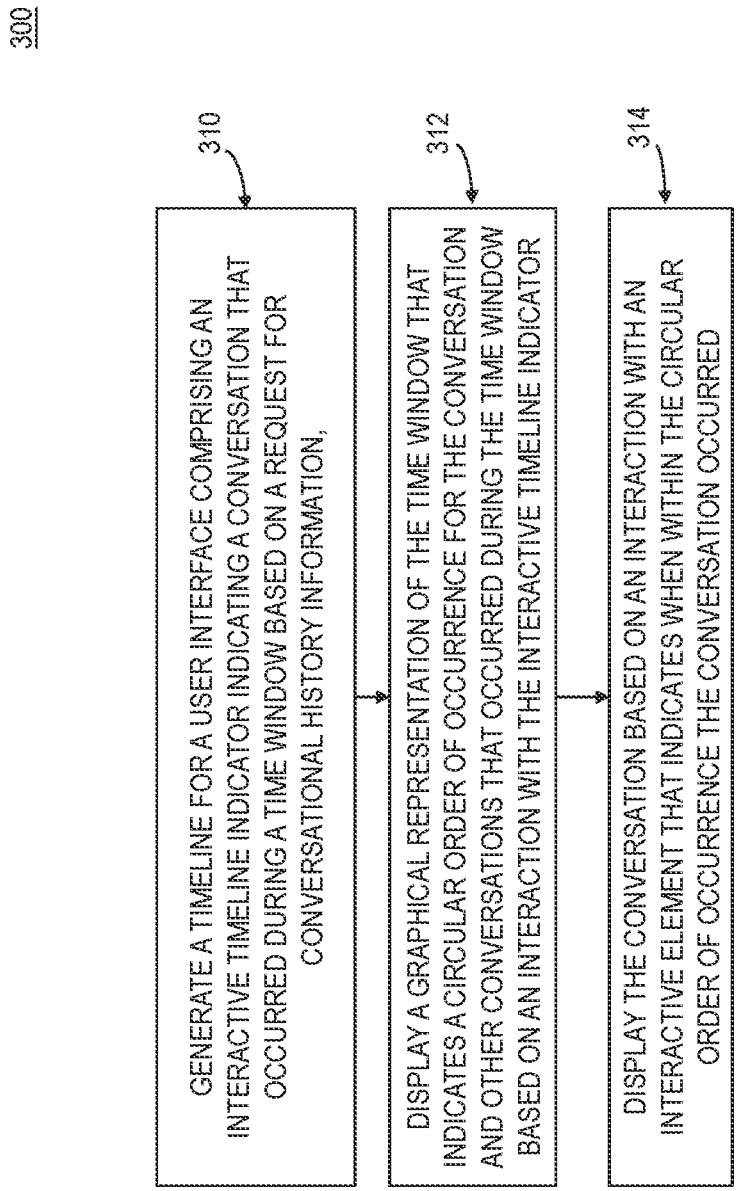
FIG. 3 shows a flowchart of an example method for displaying a summary of chat application conversations specific to a user, according to some aspects of this disclosure.

FIG. 3 shows a flowchart of an example method 300 for displaying a summary of chat application conversations specific to a user, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2. However, method 300 is not limited to the aspects of those figures.

In 310, user device 104 generates a timeline for a user interface comprising an interactive timeline indicator indicating a conversation that occurred during a time window based on a request for conversational history information. The timeline may be rendered in a web view or in a window of a native conversation or chat application. According to some aspects of this disclosure, a time window may be a day and the date of the day may be displayed on the timeline. A time window or a date might not be displayed when no conversation occurred during that time window. Alternatively, an interactive timeline indicator or conversation icon with three dots may be displayed to indicate at least one conversation occurred during that time window or for that date in the case of no conversation for a time window or date, a conversation icon may be displayed with no three dots within it.

In 312, user device 104 displays a graphical representation or conversation summary user interface view of the time window based on an interaction with the interactive timeline indicator. The graphical representation of the time window indicates a circular order of occurrence for the conversation and other conversations that occurred during the time window. The graphical representation may be opened from either a user profile or any other trigger point. According to some aspects of this disclosure, the graphical representation of the time window for the circular order of occurrence for the conversation and other conversations may be displayed in a clock, such as a 24-hour clock, as shown in FIG. 2. According to some aspects of this disclosure, an interactive timeline indicator associated with a date may be highlighted or the color of the interactive timeline indicator associated with the date may change when the date is selected. The date may be displayed in a UI, e.g., in the middle of the 24-hour clock.

In 314, user device 104 displays the conversation based on an interaction with an interactive element that indicates when within the circular order of occurrence the conversation occurred According to some aspects of this disclosure, the interactive element may indicate a type of user associated with the conversation, an amount of users associated with the conversation, and/or the like, by using different interactive elements (and/or or the same interactive elements with different colors). For example, the interactive element may indicate whether the conversation was internal or external, e.g., inside an organization or with users from outside the organization such as clients. The interactive element may indicate whether the conversation was with a single user or a group of users, e.g., using different interactive elements or the same interactive elements with different colors. When a conversation participator's name is lengthy, only part of the name may be displayed, e.g., with three dots, next to an interactive element icon associated with the conversation on the graphical representation. The user device 104 may recommend, based content of the conversation, another conversation that occurred during the time window, during another time window, and/or the like.

For example, the user device 104 may recommend another conversation that is related to or similar to the content of the conversation. The user device 104 may display, based on a second interaction with the interactive element, keywords within the conversation. For example, keywords within the conversation may be displayed when a cursor is hovered over the interactive element. According to some aspects of this disclosure, the conversation may be displayed in a corresponding conversation application with which the conversation occurred. For example, the interactive element may include a hyperlink, upon clicking on which the conversation may be displayed in the corresponding conversation application with which the conversation occurred.

Figure 4:
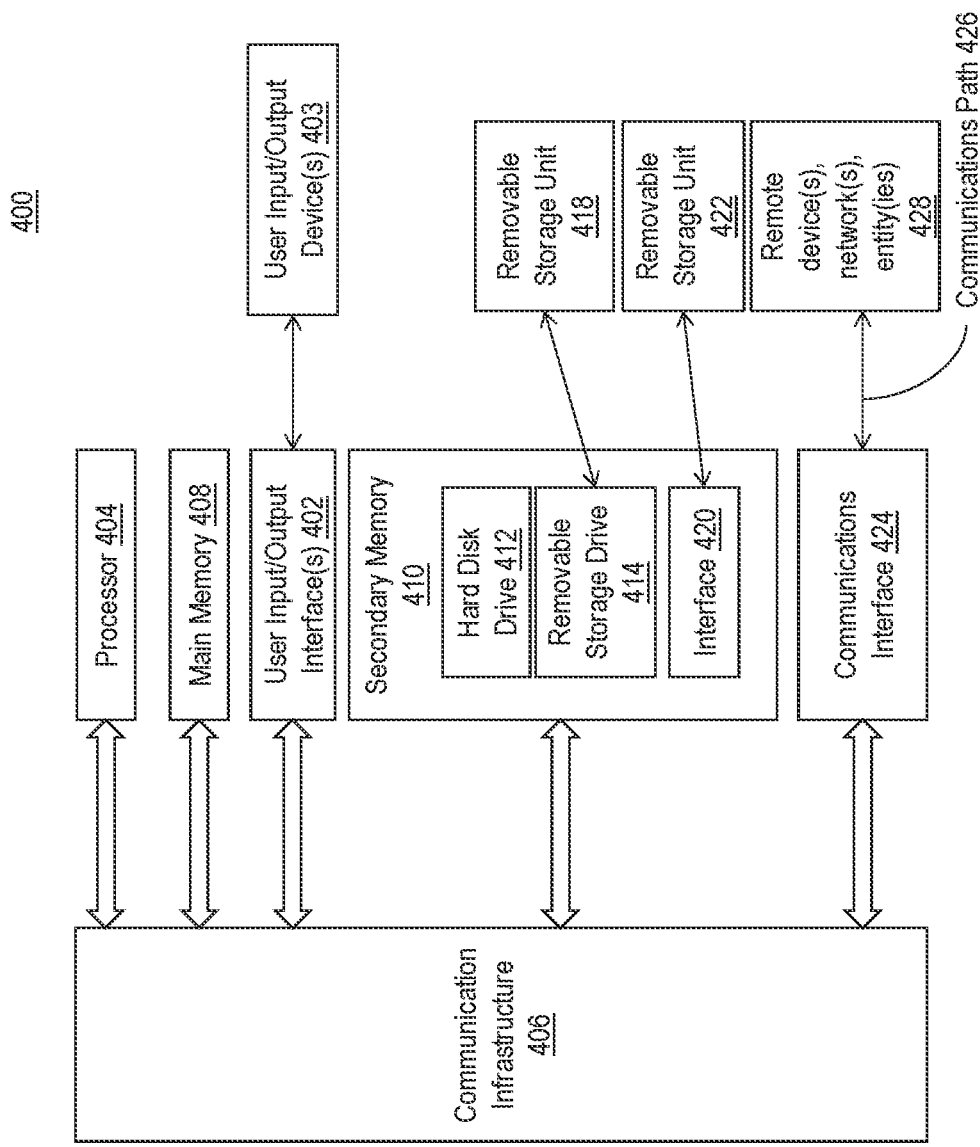
FIG. 4 shows a schematic block diagram of an example computer system in which aspects described may be implemented.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. According to some aspects of this disclosure, the user device 104 of FIG. 1 (and/or any other device/component described herein) may be implemented using the computer system 400. According to some aspects of this disclosure, the computer system 400 may be used to implement method 300 and/or any other methods and/or steps described herein.

Computer system 400 may include one or more processors (also called central processing units, or CPUs), such as a processor 404. Processor 404 may be connected to a communication infrastructure or bus 406.

Computer system 400 may also include user input/output device(s) 402, 403 such as monitors, keyboards, pointing devices, etc., which may communicate with communication infrastructure or bus 406 through user input/output device(s) 402, 403.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, a tape backup device, and/or any other storage device/drive.

Removable storage drive 414 may interact with a removable storage unit 418. The removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to the removable storage unit 418.

Secondary memory 410 may include other means, devices, components, instrumentalities, and/or other approaches for allowing computer programs and/or other instructions and/or data to be accessed by computer system 400. Such means, devices, components, instrumentalities, and/or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
generating, by one or more computing devices, based on a request for conversational history information, a timeline for a user interface comprising an interactive timeline indicator indicating a conversation that occurred during a time window;
displaying, by the one or more computing devices, based on an interaction with the interactive timeline indicator, a graphical representation of the time window, the graphical representation of the time window indicating a circular order of occurrence for the conversation and other distinct conversations that occurred during the time window; and
displaying, by the one or more computing devices, the conversation based on an interaction with an interactive element that indicates when within the circular order of occurrence the conversation occurred.

2. The method of claim 1, wherein the interactive element indicates at least one of a type of user associated with the conversation, or an amount of users associated with the conversation.

3. The method of claim 1, further comprising recommending, based on content of the conversation, another conversation that occurred at least one of during the time window or during another time window.

4. The method of claim 1, further comprising displaying, based on a second interaction with the interactive element, keywords related to or within the conversation.

5. The method of claim 1, wherein the conversation is displayed in a corresponding conversation application with which the conversation occurred.

6. The method of claim 1, wherein a range of the timeline is configurable.

7. The method of claim 1, further comprising displaying exact times of the occurrences for the conversation and other distinct conversations that occurred during the time window.

8. A non-transitory computer-readable medium having instructions stored thereon that, when executed by at least one computing device, cause the at least one computing device to perform operations comprising:
generating, based on a request for conversational history information, a timeline for a user interface comprising an interactive timeline indicator indicating a conversation that occurred during a time window;
displaying, based on an interaction with the interactive timeline indicator, a graphical representation of the time window, the graphical representation of the time window indicating a circular order of occurrence for the conversation and other distinct conversations that occurred during the time window; and
displaying the conversation based on an interaction with an interactive element that indicates when within the circular order of occurrence the conversation occurred.

9. The non-transitory computer-readable medium of claim 8, wherein the interactive element indicates at least one of a type of user associated with the conversation, or an amount of users associated with the conversation.

10. The non-transitory computer-readable medium of claim 8, wherein the operations further comprise recommending, based on content of the conversation, another conversation that occurred at least one of during the time window or during another time window.

11. The non-transitory computer-readable medium of claim 8, wherein the operations further comprise displaying, based on a second interaction with the interactive element, keywords related to or within the conversation.

12. The non-transitory computer-readable medium of claim 8, wherein the conversation is displayed in a corresponding conversation application with which the conversation occurred.

13. The non-transitory computer-readable medium of claim 8, wherein a range of the timeline is configurable.

14. The non-transitory computer-readable medium of claim 13, wherein the operations further comprise displaying exact times of the occurrences for the conversation and other distinct conversations that occurred during the time window.

15. A system comprising:
 a memory; and
 at least one processor coupled to the memory and configured to perform operations comprising:
 generating, based on a request for conversational history information, a timeline for a user interface comprising an interactive timeline indicator indicating a conversation that occurred during a time window;
 displaying, based on an interaction with the interactive timeline indicator, a graphical representation of the time window, the graphical representation of the time window indicating a circular order of occurrence for the conversation and other distinct conversations that occurred during the time window; and
 displaying the conversation based on an interaction with an interactive element that indicates when within the circular order of occurrence the conversation occurred.

16. The system of claim 15, wherein the interactive element indicates at least one of a type of user associated with the conversation, or an amount of users associated with the conversation.

17. The system of claim 15, wherein the operations further comprise recommending, based on content of the conversation, another conversation that occurred at least one of during the time window or during another time window.

18. The system of claim 15, wherein the operations further comprise displaying, based on a second interaction with the interactive element, keywords related to or within the conversation.

19. The system of claim 15, wherein the conversation is displayed in a corresponding conversation application with which the conversation occurred.

20. The system of claim 15, wherein the operations further comprise displaying exact times of the occurrences for the conversation and other distinct conversations that occurred during the time window.

* * * * *